US012253214B2

(12) United States Patent
Santos et al.

(10) Patent No.: US 12,253,214 B2
(45) **Date of Patent: *Mar. 18, 2025**

(54) COMPRESSED NATURAL GAS STORAGE AND TRANSPORTATION SYSTEM

(71) Applicant: NEARSHORE NATURAL GAS, LLC, Houston, TX (US)

(72) Inventors: Pedro T. Santos, Mountain View, CA (US); David I. Scott, Frankfort, IL (US)

(73) Assignee: NEARSHORE NATURAL GAS, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,199

(22) Filed: Jun. 26, 2023

(65) Prior Publication Data

US 2023/0332744 A1 Oct. 19, 2023

Related U.S. Application Data

(62) Division of application No. 16/482,174, filed as application No. PCT/US2018/015381 on Jan. 26, 2018, now Pat. No. 11,725,780.

(Continued)

(51) Int. Cl.

| | |
|---|---|
| ***F17C 1/02*** | (2006.01) |
| ***F17C 1/12*** | (2006.01) |
| ***F25D 3/12*** | (2006.01) |

(52) U.S. Cl.

CPC .................. *F17C 1/12* (2013.01); *F25D 3/12* (2013.01); *F17C 2201/0109* (2013.01); (Continued)

(58) Field of Classification Search

CPC .......... F25D 3/12; F25D 3/125; F25D 11/003; F17C 2270/0105; F17C 2270/0168; F17C 2270/0173

See application file for complete search history.

(56) References Cited

U.S. PATENT DOCUMENTS

| | | | |
|---|---|---|---|
| 3,034,309 | A | 5/1962 | Muck |
| 3,242,681 | A | 3/1966 | Sidney |

(Continued)

FOREIGN PATENT DOCUMENTS

| | | | |
|---|---|---|---|
| CN | 1107222 | A | 8/1995 |
| CN | 2219818 | Y | 2/1996 |

(Continued)

OTHER PUBLICATIONS

Notice of Allowance issued for Japanese Patent Application No. 2019-562211, mailed Aug. 1, 2023, pp. 1-3.

(Continued)

*Primary Examiner* — Brian M King

(74) *Attorney, Agent, or Firm* — Pillsbury Winthrop Shaw Pittman LLP

(57) ABSTRACT

A system for storing and transporting compressed natural gas includes source and destination facilities and a vehicle, each of which includes pressure vessels. The pressure vessels and gas therein may be maintained in a cold state by a carbon-dioxide-based refrigeration unit. Hydraulic fluid (and/or nitrogen) ballast may be used to fill the pressure vessels as the pressure vessels are emptied so as to maintain the pressure vessels in a substantially isobaric state that reduces vessel fatigue and lengthens vessel life. The pressure vessels may be hybrid vessels with carbon fiber and fiber glass wrappings. Dip tubes may extend into the pressure vessels to selectively expel/inject gas from/into the top of the vessels or hydraulic fluid from/into the bottom of the vessels. Impingement deflectors are disposed adjacent to the dip tubes inside the vessels to discourage fluid-induced erosion of vessel walls.

4 Claims, 8 Drawing Sheets

Related U.S. Application Data

(60) Provisional application No. 62/452,906, filed on Jan. 31, 2017.

(52) U.S. Cl.
CPC .. *F17C 2201/035* (2013.01); *F17C 2203/012* (2013.01); *F17C 2203/0362* (2013.01); *F17C 2203/0604* (2013.01); *F17C 2203/0619* (2013.01); *F17C 2203/067* (2013.01); *F17C 2221/033* (2013.01); *F17C 2223/0123* (2013.01); *F17C 2227/0192* (2013.01); *F17C 2227/0341* (2013.01); *F17C 2270/0105* (2013.01); *F17C 2270/0168* (2013.01); *F17C 2270/0173* (2013.01)

(56) References Cited

U.S. PATENT DOCUMENTS

| | | | | |
|---|---|---|---|---|
| 4,695,302 | A | 9/1987 | Tyree, Jr. | |
| 4,907,423 | A | 3/1990 | Hase | |
| 5,454,408 | A | 10/1995 | Dibella | |
| 5,603,360 | A | 2/1997 | Teel | |
| 5,775,111 | A | 7/1998 | Franklin | |
| 5,884,675 | A | 3/1999 | Krasnov | |
| 5,908,141 | A | 6/1999 | Teel | |
| 5,979,173 | A | 11/1999 | Tyree | |
| 6,023,942 | A | 2/2000 | Thomas | |
| 6,109,058 | A | 8/2000 | Franklin, Jr. | |
| 6,182,458 | B1 * | 2/2001 | Franklin, Jr. | C01B 32/55<br>62/347 |
| 6,220,051 | B1 | 4/2001 | Takasugi | |
| 6,367,264 | B1 | 4/2002 | Tyree, Jr. | |
| 6,761,043 | B1 | 7/2004 | Reznikov | |
| 9,303,912 | B1 | 4/2016 | Schalla | |
| 11,725,780 | B2 * | 8/2023 | Santos | F17C 1/12<br>62/53.2 |
| 2004/0083756 | A1 | 5/2004 | Tranier | |
| 2005/0035210 | A1 * | 2/2005 | Bucceri | B01F 35/7548<br>239/14.2 |
| 2006/0086412 | A1 | 4/2006 | Spittael | |
| 2006/0283519 | A1 * | 12/2006 | Campbell | F17C 1/002<br>141/82 |
| 2008/0209916 | A1 | 9/2008 | White | |
| 2009/0183514 | A1 | 7/2009 | Holmes | |
| 2013/0174583 | A1 | 7/2013 | Lee | |
| 2013/0206282 | A1 | 8/2013 | Oztas | |
| 2013/0301781 | A1 | 11/2013 | Parvin | |
| 2015/0211684 | A1 | 7/2015 | Santos | |
| 2015/0251758 | A1 | 9/2015 | Vandyke | |
| 2016/0123535 | A1 | 5/2016 | Gouvêa | |
| 2016/0270433 | A1 | 9/2016 | Lilakos | |
| 2018/0128171 | A1 | 5/2018 | Morgan et al. | |
| 2019/0063265 | A1 | 2/2019 | Sinatov | |
| 2021/0355845 | A1 | 11/2021 | Conlon | |

FOREIGN PATENT DOCUMENTS

| | | | |
|---|---|---|---|
| CN | 104302961 | B | 1/2015 |
| CN | 106240438 | A | 12/2016 |
| JP | 7341894 | B2 | 9/2023 |
| KR | 102537458 | B1 | 5/2023 |
| RU | 2432523 | C1 | 10/2011 |
| WO | 03066423 | A1 | 8/2003 |
| WO | 2015006761 | A1 | 1/2015 |

OTHER PUBLICATIONS

International Search Report and Written Opinion of the International Searching Authority issued on Sep. 29, 2023 in related International Patent Application No. PCT/US2023/020695, 19 pages.
Examination Report issued for Australian Patent Application No. 2018216680, dated Apr. 4, 2023, pp. 1-5.
Notice of Preliminary Rejection issued in corresponding Korean Patent Application No. 10-2019-7025506, dated Aug. 21, 2022.
Examination Report issued in corresponding European Patent Application No. 18747670.0, dated Nov. 7, 2022.
Rejection Decision issued in corresponding Japanese Patent Application No. 2019-562211, dated Nov. 29, 2022.
Second Office Action issued in corresponding Chinese Patent Application No. 2018800234636, dated Jan. 26, 2022.
Non-Final Office Action issued in corresponding Japanese Patent Application No. 2019-562211, dated Feb. 1, 2022.
First Office Action issued in corresponding Chinese Patent Application No. 201880023463.6, dated May 14, 2021.
Extended Search Report, including the search opinion, as issued for corresponding European Patent Application No. 18747670.0, dated Nov. 4, 2020.
First Examination Report as issued for corresponding Indian Patent Application No. 201917030599, dated Aug. 10, 2020.
Official Action as issued for corresponding Eurasian Patent Application No. 201991821, dated Aug. 4, 2020.
International Search Report and Written Opinion of the International Searching Authority issued on May 10, 2018 in related International Patent Application No. PCT/US2018/015381, 13 pages.
Examination Report issued for Australian Patent Application No. 2018216680, dated Jan. 4, 2024, pp. 1-2.

* cited by examiner

COMPRESSED NATURAL GAS STORAGE AND TRANSPORTATION SYSTEM

CROSS-REFERENCE TO PRIOR APPLICATIONS

This application is a divisional of U.S. patent application Ser. No. 16/482,174, filed Jul. 30, 2019, now allowed, which is a National Stage of International Patent Application No. PCT/US2018/015381, filed Jan. 26, 2018, which claims the benefit of priority to U.S. Provisional Patent Application No. 62/452,906, filed Jan. 31, 2017, all of which are hereby expressly incorporated by reference in their entirety.

BACKGROUND

1. Field of the Invention

Various embodiments relate generally to the storage and transportation of compressed natural gas (CNG).

2. Description of Related Art

Gaseous fuels, such as natural gas, are typically transported by pipeline, although there are users of natural gas that periodically require natural gas supply in excess of the supply available through existing pipelines. In addition, there are areas in which natural gas service via pipeline is not available at all, due to remoteness, the high cost of laying pipelines, or other factors. For such areas, natural gas can be transported via CNG vessels, for example as described in PCT Publication No. WO2014/031999, the entire contents of which are hereby incorporated by reference.

Natural gas is conventionally transported across waterways (e.g., rivers, lakes, gulfs, seas, oceans) in liquid natural gas (LNG) form. However, LNG requires complicated and expensive liquefaction plant and special handling on both the supply and delivery side. LNG also requires regasification upon delivery, which involves using substantial amounts of heat and complex cryogenic heat exchangers as well as cryogenic delivery/storage equipment.

SUMMARY

One or more non-limiting embodiments provide a cold compressed gas transportation vehicle that includes: a vehicle; an insulated space supported by the vehicle; a compressed gas storage vessel that is at least partially disposed in the insulated space; and a carbon-dioxide-refrigerant-based refrigeration unit supported by the vehicle and configured to cool the insulated space.

According to one or more of these embodiments, the refrigeration unit is configured to maintain a temperature within the insulated space between −58.7 and −98.5 degrees C.

According to one or more of these embodiments, the vehicle is a ship or a wheeled vehicle.

According to one or more of these embodiments, the refrigeration unit is configured to deposit solid carbon dioxide into the insulated space.

According to one or more of these embodiments, the refrigeration unit is configured to provide passive, sublimation-based cooling to the insulated space when solid carbon dioxide is in the insulated space, even when the refrigeration unit is off.

According to one or more of these embodiments, the vessel includes a gas port that fluidly connects to an upper portion of an interior volume of the vessel, and a hydraulic fluid port that fluidly connects to a lower portion of an interior volume of the vessel.

According to one or more of these embodiments, the vehicle is combined with a source facility that includes: a source of compressed gas configured to be fluidly connected to the gas port of the vehicle's vessel so as to deliver compressed gas to the vehicle's vessel, a hydraulic fluid reservoir configured to be fluidly connected to the hydraulic port of the vehicle's vessel by a hydraulic fluid passageway so as to facilitate the transfer of hydraulic fluid between the vehicle's vessel and the reservoir, and a pressure-actuated valve disposed in the hydraulic fluid passageway and configured to permit hydraulic fluid to flow from the vehicle's vessel to the source facility's hydraulic fluid reservoir when a pressure in the vehicle's vessel exceeds a predetermined pressure as compressed gas flows from the source of compressed gas into the vehicle's vessel.

One or more embodiments provides a method for transporting cold compressed gas, the method including: storing compressed gas in a storage vessel that is inside an insulated space of a vehicle; refrigerating the insulated space using a carbon-dioxide-based refrigeration unit; and moving the vehicle toward a destination facility.

According to one or more of these embodiments, the compressed gas includes compressed natural gas.

According to one or more of these embodiments, refrigerating the insulated space includes depositing solid carbon dioxide in the insulated space.

According to one or more of these embodiments, said moving includes moving the vehicle from a first geographic site to a second geographic site, and wherein a temperature within the insulated space remains between −98.7 and −58.5 degrees C. throughout said moving.

One or more embodiments provides a method of loading compressed gas into a vessel containing a hydraulic fluid, the method including: loading compressed gas into the vessel by (1) injecting the compressed gas into the vessel and (2) removing hydraulic fluid from the vessel, wherein, throughout said loading, a pressure within the vessel remains within 20% of a certain psig pressure.

According to one or more of these embodiments, throughout said loading, the pressure within the vessel remains within 1000 psi of the certain psig pressure.

According to one or more of these embodiments, the certain pressure is at least 3000 psig.

According to one or more of these embodiments, at least a portion of said injecting occurs during at least a portion of said removing.

According to one or more of these embodiments, the hydraulic fluid is a silicone-based fluid.

According to one or more of these embodiments, throughout said loading, a temperature in the vessel remains within 30 degrees C. of −78.5 degrees C.

According to one or more of these embodiments, a hydraulic fluid volume in the vessel before said loading exceeds a hydraulic fluid volume in the vessel after said loading by least 50% of an internal volume of the vessel.

According to one or more of these embodiments, the method also includes: after said loading, unloading the vessel by (1) injecting hydraulic fluid into the vessel and (2) removing compressed gas from the vessel, wherein during said unloading the pressure within the vessel remains within 20% of the certain psig pressure.

According to one or more of these embodiments, throughout said unloading, a temperature of the vessel remains within 30 degrees C. of −78.5 degrees C.

According to one or more of these embodiments, a hydraulic fluid volume in the vessel after said unloading exceeds a hydraulic fluid volume in the vessel before said unloading by least 50% of the internal volume of the vessel.

According to one or more of these embodiments, the method also includes: cyclically repeating said loading and unloading at least 19 more times, wherein throughout said cyclical repeating, the pressure within the vessel remains within 20% of the certain psig pressure.

According to one or more of these embodiments, the vessel is supported by a vehicle, the loading occurs at a first geographic site, and the unloading occurs at a second geographic site that is different than the first geographic site.

One or more embodiments provide a compressed gas storage and transportation vehicle that includes: a vehicle; a compressed gas storage vessel supported by the vehicle; a hydraulic fluid reservoir supported by the vessel; a passageway connecting the hydraulic fluid reservoir to the compressed gas storage vessel; and a pump disposed in the passageway and configured to selectively pump hydraulic fluid through the passageway from the reservoir into the compressed gas storage vessel.

According to one or more of these embodiments, the compressed gas storage vessel includes a plurality of pressure vessels, and the reservoir is at least partially disposed in an interstitial space between the plurality of pressure vessels.

According to one or more of these embodiments, the vehicle is a ship, a locomotive, or a locomotive tender.

According to one or more of these embodiments, the combination also includes, an insulated space supported by the vehicle, wherein the vessel and reservoir are disposed in the insulated space, and a carbon-dioxide-refrigerant-based refrigeration unit supported by the vehicle and configured to cool the insulated space.

One or more embodiments provide a method of transferring compressed gas, the method including: loading compressed gas into a vessel at a first geographic site; after said loading, moving the vessel to a second geographic site that is different than the first geographic site; unloading compressed gas from the vessel at the second geographic site; loading compressed nitrogen into the vessel at the second geographic site; after said unloading and loading at the second geographic site, moving the vessel to a third geographic site; and unloading nitrogen from the vessel at the third geographic site, wherein, throughout the loading of compressed gas and nitrogen into the vessel, moving of the vessel to the second and third geographic sites, and unloading of the compressed gas and nitrogen from the vessel, a pressure within the vessel remains within 20% of a certain psig pressure.

According to one or more of these embodiments, the first geographic site is the third geographic site.

According to one or more of these embodiments, the method also includes repeating these loading and unloading steps while the pressure within the vessel remains within 20% of the certain psig pressure.

One or more embodiments provides a vessel for storing compressed gas, the vessel including: a fluid-tight liner defining therein an interior volume of the vessel; at least one port in fluid communication with the interior volume; carbon fiber wrapped around the liner; and fiber glass wrapped around the liner.

According to one or more of these embodiments, the interior volume is generally cylinder shaped with bulging ends.

According to one or more of these embodiments, an outer diameter of the vessel is at least three feet.

According to one or more of these embodiments, the interior volume is at least 10,000 liters.

According to one or more of these embodiments, a ratio of a length of the vessel to an outer diameter of the vessel is at least 4:1.

According to one or more of these embodiments, a ratio of a length of the vessel to an outer diameter of the vessel is less than 10:1.

According to one or more of these embodiments, the carbon fiber is wrapped around the liner along a path that strengthens a weakest portion of the liner, in view of a shape of the interior volume.

According to one or more of these embodiments, the carbon fiber is wrapped diagonally around the liner relative to longitudinal axis of the vessel that is concentric with the cylinder shape.

According to one or more of these embodiments, the liner includes ultra-high molecular weight polyethylene.

According to one or more of these embodiments, the carbon fiber is wrapped in selective locations around the liner such that the carbon fiber does not form a non-homogeneous/discontinuous layer around the liner.

According to one or more of these embodiments, the fiber glass is wrapped around the liner so as to form a continuous layer around the liner.

According to one or more of these embodiments, the vessel also includes a plurality of longitudinally-spaced reinforcement hoops disposed outside the liner.

According to one or more of these embodiments, the vessel also includes a plurality of tensile structures extending longitudinally between two of said plurality of longitudinally-spaced reinforcement hoops, wherein said plurality of tensile structures are circumferentially spaced from each other.

According to one or more of these embodiments, the at least one port includes a first port; the vessel further includes: a first dip tube inside the interior volume and in fluid communication with the first port, the first dip tube having a first opening that is in fluid communication with the interior volume, the first opening being disposed in a lower portion of the interior volume; and a first impingement deflector disposed in the interior volume between the first opening and an interior surface of the liner, the first impingement deflector being positioned so as to discourage substances that enter the interior volume via the first dip tube from forcefully impinging on the interior surface of the liner.

According to one or more of these embodiments, the at least one port includes a second port, and the vessel further includes: a second dip tube inside the interior volume and in fluid communication with the second port, the second dip tube having a second opening that is in fluid communication with the interior volume, the second opening being disposed in an upper portion of the interior volume, and a second impingement deflector disposed in the interior volume between the second opening and the interior surface of the liner, the second impingement deflector being positioned so as to discourage substances that enter the interior volume via the second dip tube from forcefully impinging on the interior surface of the liner.

One or more embodiments provide a vessel for storing compressed gas, the vessel including: a fluid-tight vessel having an interior surface that forms an interior volume; a first port in fluid communication with the interior volume; a first dip tube inside the interior volume and in fluid communication with the first port, the first dip tube having a first opening that is in fluid communication with the interior volume, the first opening being disposed in one of a lower or upper portion of the interior volume; and a first impingement deflector disposed in the interior volume between the first opening and the interior surface, the first impingement deflector being positioned so as to discourage substances that enter the interior volume via the first dip tube from forcefully impinging on the interior surface of the liner.

According to one or more of these embodiments, the first opening is disposed in the lower portion of the interior volume; and the vessel further includes: a second port in fluid communication with the interior volume; a second dip tube inside the interior volume and in fluid communication with the second port, the second dip tube having a second opening that is in fluid communication with the interior volume, the second opening being disposed in an upper portion of the interior volume; and a second impingement deflector disposed in the interior volume between the second opening and the interior surface, the second impingement deflector being positioned so as to discourage substances that enter the interior volume via the second dip tube from forcefully impinging on the interior surface.

One or more embodiments provides a combination that includes: a pressure vessel forming an interior volume; a first passageway fluidly connecting the interior volume to a port; a normally-open, sensor-controlled valve disposed in the passageway, the valve having a sensor; a second passageway connecting the interior volume to a vent; and a burst object disposed in and blocking the second passageway so as to prevent passage of fluid from the interior volume to the vent, the burst object being exposed to the pressure within the interior volume and having a lower failure-resistance to such pressure than the pressure vessel, wherein the burst object is positioned and configured such that a pressure-induced failure of the burst object would unblock the second passageway and cause pressurized fluid in the interior volume to vent from the interior volume to the vent via the second passageway, wherein the sensor is operatively connected to the second passageway between the burst object and the vent and is configured to sense flow of fluid resulting from a failure of the burst object and responsively close the valve.

One or more of these and/or other aspects of various embodiments, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranges, 2-10, 1-9, 3-9, etc.

BRIEF DESCRIPTION OF THE DRAWINGS

For a better understanding of various embodiments as well as other objects and further features thereof, reference is made to the following description which is to be used in conjunction with the accompanying drawings, where.

DETAILED DESCRIPTION OF EXEMPLARY EMBODIMENTS

Figure 1:
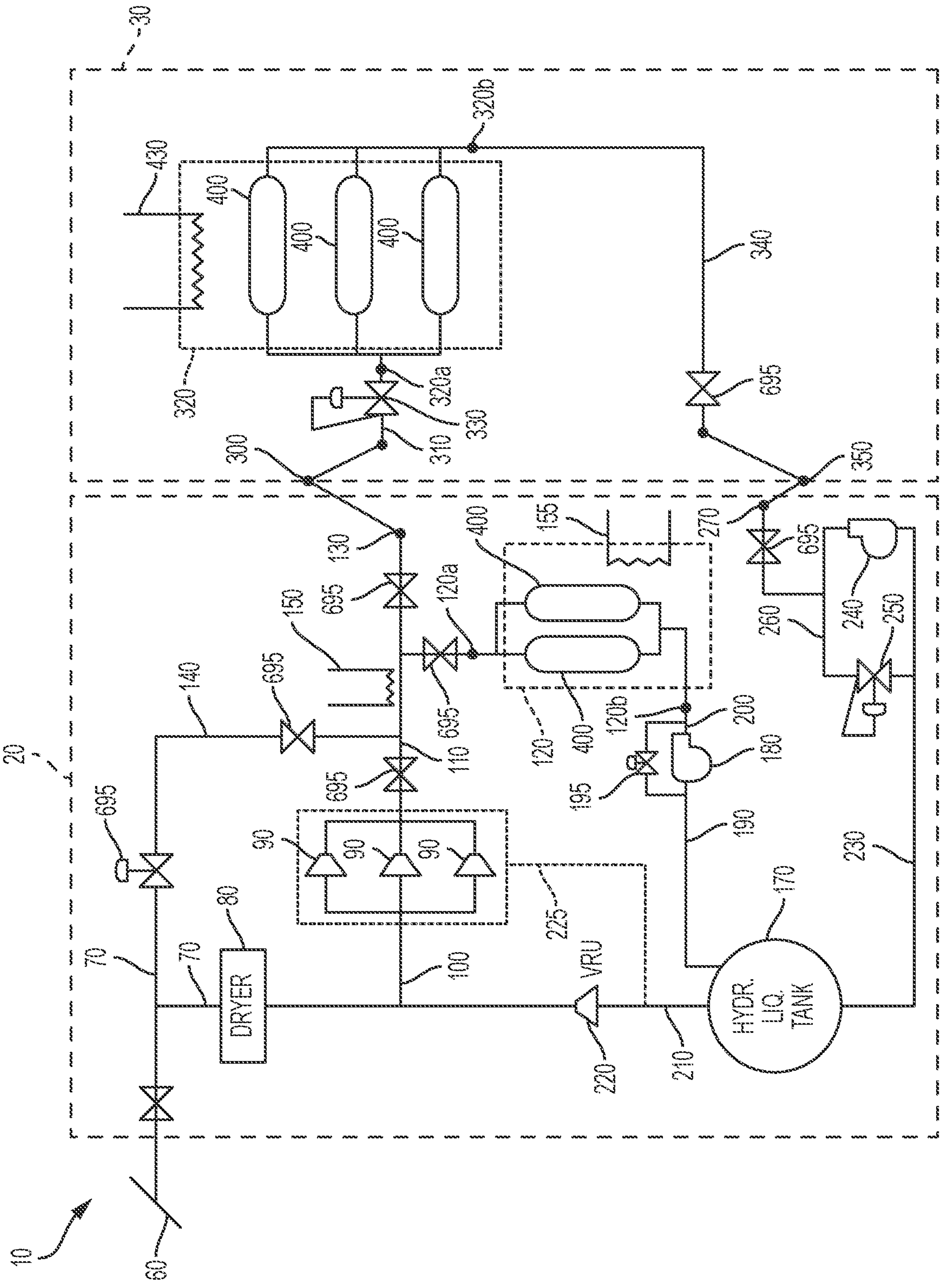
FIG. 1 is a diagrammatic view of a source facility and vehicle according to an embodiment of a CNG storage and transportation system.
Figure 2:
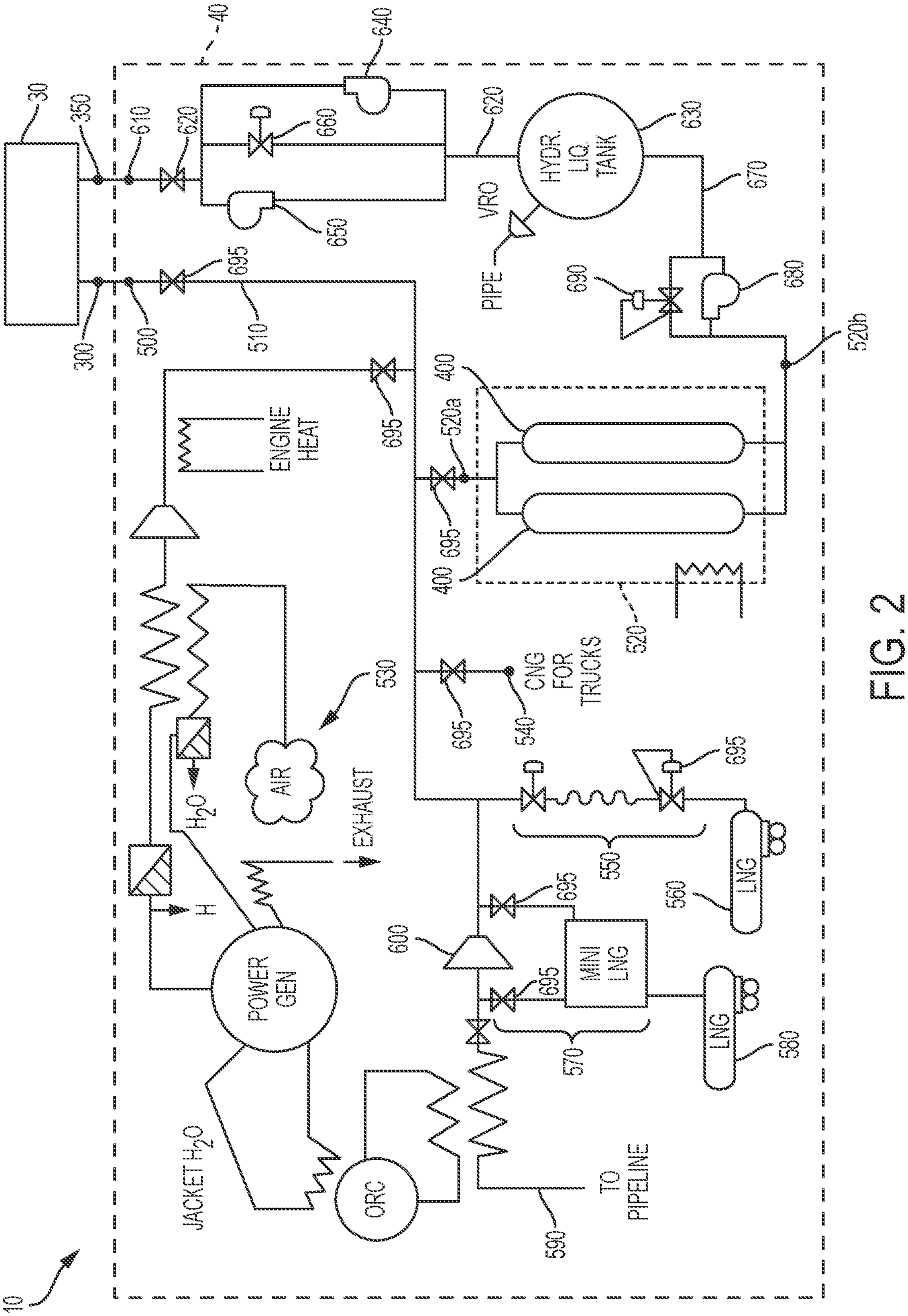
FIG. 2 is a diagrammatic view of the vehicle of FIG. 1 docked with a destination facility.

FIGS. 1-2 diagrammatically illustrate a CNG transportation system 10 according to one or more embodiments. The system includes a source facility 20 (see FIG. 1), a vehicle 30, and a destination facility 40 (see FIG. 2). The source and destination facilities 20, 40 are at different geographic sites (e.g., which are separated from each other by at least 0.1, 0.5, 1, 5, 10, 20, 30, 40, 50, 75, 100, 250, 500, 750, and/or 1000 miles).

CNG Source Facility

As shown in FIG. 1, the source facility 20 receives a supply of natural gas from a natural gas source 60 (a natural gas pipeline; a wellhead; a diverter from a flare gas passage (e.g., of an oil well or platform or other facility where gas might otherwise be flared); a source of biogas (e.g., a digester or landfill); a gas processing and conditioning system where lean gas is used onsite and richer gas might otherwise be flared; a source that provides NGLs condensed from rich gas when lean gas would otherwise be flared; etc.). A passageway 70 extends from the source 60 to an inlet of a dryer 80. An outlet of the dryer 80 connects to the inlet(s) of one or more parallel or serial compressors 90 via a passageway 100. A passageway 110 connects the outlet(s) of the compressor(s) 90 to a gas port/connector **120*a* of a cold storage unit 120. The passageway 110 also connects to a discharge port/connector 130 of the source facility 20. A bypass passageway 140 bypasses the compressor(s) 90 so as to connect the source 60 directly to the passageway 110. The by-pass passageway 140 may be used to conserve energy and avoid excess compressor 90 use when upstream pressure from the source 60** is sufficiently high without compression.

An active cooling system 150 cools natural gas passing through the passageway 110, preferably to a cold storage temperature range. An active cooling system 155 maintains the vessels 400 of the cold storage unit 120 within the desired cold storage temperature range. According to various embodiments, the cooling system 150, 155 may utilize any suitable cooling technology (e.g., the CO2 cooling cycle used by the below-discussed cooling system 430). The system 155 may provide passive cooling via CO2 sublimation in the same manner as described below with respect to the cooling system 430. According to various embodiments, the cold storage range may be a temperature within 80, 70, 60, 50, 40, 30, 20, 10, and/or 5° C. of −78.5° C. (i.e., the sea-level sublimation temperature of CO2). According to various embodiments, the cold storage temperature range extends as high as 5° C. for alternative passive or phase-change refrigerants such as paraffin waxes, among others.

As shown in FIG. 1, the source facility 20 includes a hydraulic fluid reservoir 170 that connects to an inlet of a pump 180 via a passageway 190. A pressure-controlled valve 195 is disposed in parallel with the pump 180. A passageway 200 connects an outlet of the pump 180 to a hydraulic fluid port/connector 120*b* of the cold storage unit 120.

As shown in FIG. 1, a passageway 210 connects the hydraulic fluid reservoir 170 to an inlet of a vapor recovery unit (VRU) compressor 220. An outlet of the compressor 220 connects to the passageway 100. The compressor 220 collects and recirculates dissolved gas that can come out of solution with the hydraulic fluid in the reservoir 170 (particularly if the reservoir 170 is depressurized).

According to various embodiments, the compressor 90 is enclosed so that gas leaking from the compressors 90, which would otherwise leak into the ambient environment, is collected and returned to the VRU compressor 220 via a passageway 225 to be recirculated into the system.

As shown in FIG. 1, a passageway 230 connects the hydraulic fluid reservoir 170 to an inlet of a pump 240 and an outlet of a pressure-controlled valve 250. A passageway 260 connects an outlet of the pump 240 to an inlet of the valve 250 and a hydraulic fluid port/connector 270.

The source facility 20 may comprise a land-based facility with a fixed geographic location (e.g., at a port, along a CNG gas supply pipeline, at a rail hub). Alternatively, the source facility 20 may itself be supported by a vehicle (e.g., a wheeled trailer, a rail vehicle (e.g., a locomotive, locomotive tender, box car, freight car, tank car), a floating vessel such as a barge or ship) to facilitate movement of the source facility 20 to different gas sources 60 (e.g., a series of wellheads). Although the illustrated embodiments show a single offtake point between the source facility 20 and one vehicle 30, the source facility 20 may include multiple offtake points along a pipeline so as to facilitate the simultaneous filling of multiple vehicles 30 or other vessels with gas.

Vehicle 30

As shown in FIG. 1, the vehicle 30 may be any type of movable vehicle, e.g., a barge, a ship, a wheeled trailer, rail car(s). The vehicle 30 includes a gas port/connector 300 that is configured to detachably connect to the port/connector 130 of the source facility 20. A passageway 310 connects the port/connector 300 to a gas port 320*a* of a cold storage unit 320 of the vehicle 30. A pressure-controlled valve 330 is disposed in the passageway 310. A hydraulic fluid port 320*b* of the cold storage unit 320 connects, via a passageway 340, to a hydraulic fluid connector/port 350 of the vehicle 30. The hydraulic fluid connector/port 350 is configured to detachably connect to the port/connector 270 of the source facility 20.

Cold Storage Units

Figure 3:
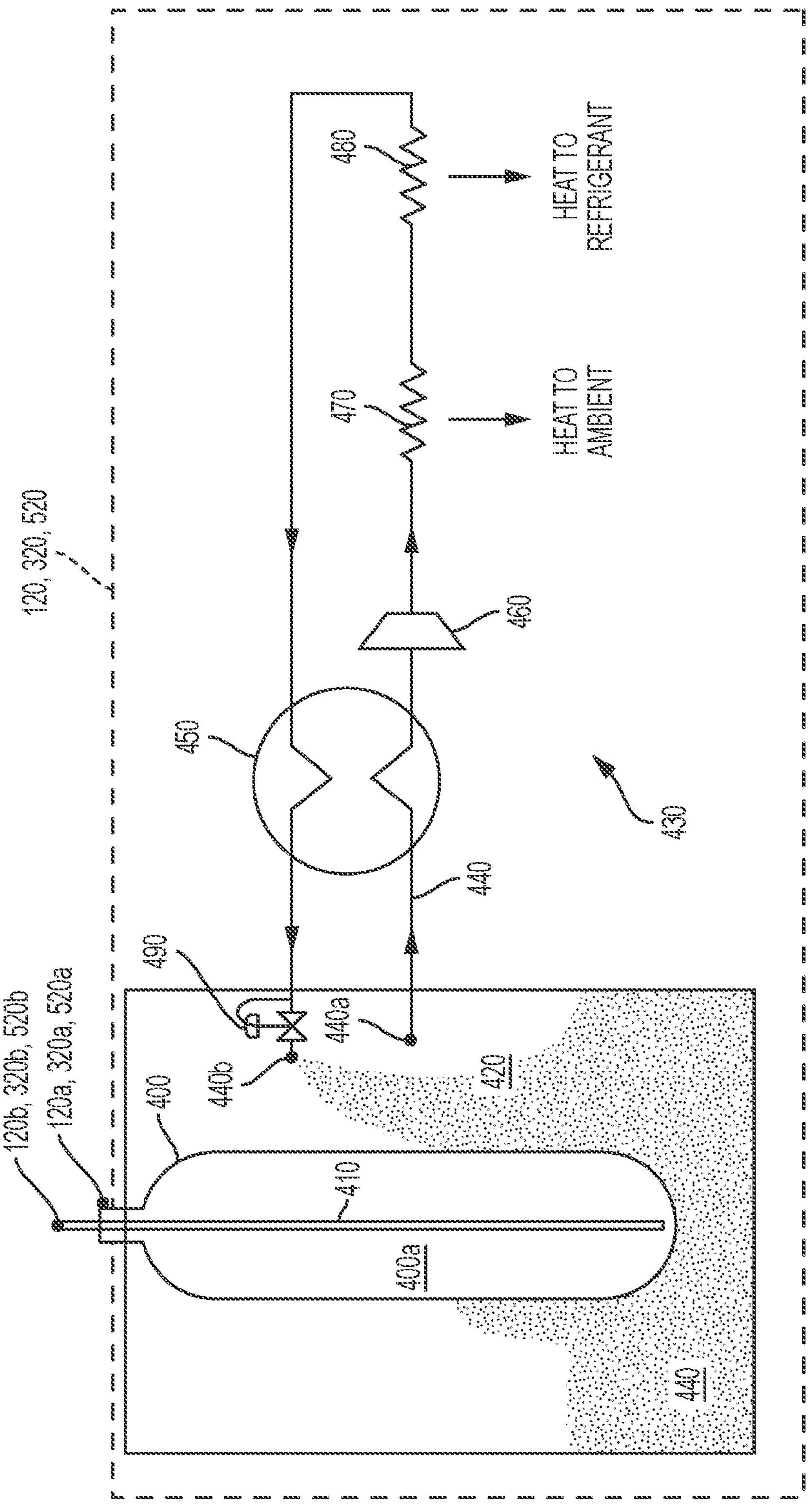
FIG. 3 is a diagrammatic view of a cold CNG storage unit of the system disclosed in FIGS. 1 and 2.

As shown in FIG. 3, each of the cold storage units 120, 320, 520 of the source facility 20, vehicle 30, and/or destination facility 40 may be structurally and/or functionally similar or identical to each other. The units 120, 320, 520 include one or more parallel storage/pressure vessels 400. The vessel(s) 400 are illustrated as a single vessel 400 in FIG. 3, but are illustrated as multiple parallel vessels 400 in FIGS. 1 and 5. As shown in FIG. 3, an upper portion of an interior storage volume 400*a* of the vessel 400 fluidly connects to the gas port 120*a*, 320*a*, 520*a* of the unit 120, 320, 520. A lower portion of the interior storage volume 400*a* of the vessel fluidly connects to the hydraulic fluid port 120*b*, 320*b*, 520*b* of the unit 120, 320, 520. As illustrated in FIG. 3, the hydraulic fluid port 120*b*, 320*b* connects to the lower portion of the volume 400*a* via a dip tube passageway 410 that extends through the port 120*a*, 320*a* down to a lower portion of the interior volume 400*a*. Alternatively, as shown with respect to the unit 120 in FIG. 1, the port 120*b*, 320*b*, 520*b* may connect be directly formed in a lower (e.g., bottom) of the vessel 400 so as to be connected to a lower portion of the interior 400*a* of the vessel 400.

The vessel(s) of each unit 120, 320, 520 are housed within an insulated, sealed space 420, which may be formed by any suitable insulator or combination of insulators (e.g., foam, plastics, inert gas spaces, vacuum spaces, etc.). In the case of a land-based unit (e.g., the unit 120 according to various embodiments of the source facility 20), a portion of the space 420 may be formed by concrete walls.

As shown in FIG. 3, the insulated space 420 and vessels 400 are kept cold by a refrigeration system 430 the preferably maintains the vessels 400 within a cold storage temperature range (e.g., a temperature within 30, 20, 10, and/or 5° C. of −78.5° C. (i.e., the sublimation temperature of CO2)). The illustrated refrigeration system 430 comprises a CO2 refrigeration system that forms and deposits solid CO2 440 in the space 420. The system 430 works as follows. Gaseous CO2 is drawn from the space 420 into an inlet 440*a* of a passageway 440 that flows sequentially through a heat exchanger 450, a compressor 460 that compresses the CO2 gas, a heat exchanger 470 that dumps heat from the CO2 gas into an ambient environment, an active conventional cooling system 480 that draws heat from the CO2 gas via a conventional refrigerant (e.g., Freon, HFA) or other cooling system and liquefies the pressurized CO2, the heat exchanger 450, a pressure-controlled valve 490, and an outlet 440*b* of the passageway. According to various non-limiting embodiments, the expansion cooling is sufficient that the cooling system 480 may be sometimes turned off or eliminated altogether. Passage of the pressurized liquid CO2 through the valve 490 and outlet 440*b* quickly depressurizes the CO2, causing it to solidify into solid CO2 440 that at least partially fills the space 420, until it sublimates and reenters the inlet 440*a*. The solid CO2 440 tends to keep the space 420 and vessels 400 at about −78.5° C. (i.e., the sublimation temperature of CO2 at ambient pressure/sea level).

The use of a solid CO2 refrigeration systems 150, 155, 430 offers various benefits, according to various non-limiting embodiments. For example, the accumulated solid CO2 440 in the space 420 can provide passive cooling for the vessels 400 if the active system 430 temporarily fails. The passive solid CO2 cooling can provide time to fix the system 430 and/or to offload CNG from the vessels 400 if the vessels 400 are ill-equipped to handle their existing CNG loading at a higher temperature. Solid CO2 refrigeration systems 150, 155, 430 tend to be simple and inexpensive, especially when compared to other refrigeration systems that achieve similar temperatures.

Solid CO2 refrigeration systems 150, 155, 430 are particularly well suited for maintaining the space 420 at a relatively constant temperature, i.e., the −78.5° C. sublimation temperature of CO2. The relatively constant temperature of the space 420 tends to discourage the vessel(s) 400 from changing temperature, which, in turn, tends to discourage large pressure changes within the vessel(s) 400, which reduces fatigue stresses on the vessel(s) 400, which can extend the useful life of the vessel(s) 400.

According to one or more non-limiting embodiments, the natural storage temperature of a CO2 cooling system 150, 155, 430 (e.g., at or around −78.5° C.) offers one or more benefits. First, CNG is quite dense at such temperatures and the operating pressures used by the vessels 400. For example, at 4500 psig and −78.5° C., CNG's density is about 362 kg/m3, which approaches the effective/practical density of liquid natural gas (LNG) at 150 psig, particularly when one accounts for (1) the required vapor head room/empty space required for LNG storage, and/or (2) the heel amount of LNG that is used to maintain an LNG vessel at a cold temperature to prevent thermal shocks). This makes CNG competitive with LNG from a mass/volume basis, particularly in view of the more complicated handling and liquefaction procedures required for LNG. Second, although −78.5° C. is cold, a variety of cheap, readily-available materials can handle such temperatures and may be used for the various components of the system 10 (e.g., valves, passageways, vessels, pumps, compressors, etc.). For example, low-nickel content steel (e.g. 3.5%) can be used at such temperatures. In contrast, more expensive, higher-nickel content steels (e.g., 6+%) are typically used at the lower temperatures associated with LNG. Third, a variety of cheap, readily available hydraulic fluids 770 (e.g., silicone-based fluids) for use in the system 10 remain liquid and relatively non-viscous at or around −78.5° C. In contrast, typical hydraulic fluids are not feasibly liquid and non-viscous at the typical operating temperatures of LNG systems. Fourth, according to various non-limiting embodiments, the CO2 temperature range of the system 150, 155, 430 can avoid the need for more expensive equipment that could be required at lower operating temperatures.

According to various non-limiting embodiments, a CO2 cooling system 155, 430 provides fire suppression benefits as well by generally encasing the vessels 400 in a fire-retardant volume of CO2. CO2 is heavier than oxygen, so the CO2 layer will tend to stay around the vessels 400 and displace oxygen upward and out of the space 420. For example, in a ship embodiment of the vehicle 30 in which walls within or of a cargo hold of the ship 30 forms the insulated space 420, the space 420 will naturally tend to fill with heavier-than-air CO2, which will tend to suppress fires in the space 420.

According to various embodiments, the hydraulic fluid is preferably a generally incompressible fluid such as a liquid.

The illustrated refrigeration systems 150, 155, 430 are based on solid CO2 refrigeration cycles. However, any other type of refrigeration system may alternatively be used for the systems 150, 155, 430 without deviating from the scope of the present invention (e.g., cascade systems that depend on multiple refrigerant loops; a refrigeration system that utilizes a different refrigerant (e.g., paraffin wax)). For example, other low expansion coefficient passive heat exchange systems could be used such as paraffin waxes, which change phase from liquid to solid for example at −20C and have a high thermal mass. Such systems may provide passive cooling. Moreover, the refrigeration systems 150, 155, 430 may be eliminated altogether without deviating from the scope of the invention, e.g., in the case of embodiments that rely on warmer (e.g., ambient) CNG storage units, rather than the illustrated cold storage units.

CNG Transfer From Source To Source Facility Cold Storage Unit

Hereinafter, transfer of CNG from the source 60 to the source facility cold storage unit 120 is described with reference to FIG. 1. When the vessels 400 of the storage unit 120 do not contain CNG, they are filled with pressurized hydraulic fluid and maintained at a desired pressure. To fill the unit 120 with CNG, CNG from the source 60 flows through the passageway 70, dryer 80, and passageway 100 to the compressor(s) 90. The compressors 90 compress the CNG. This compression tends to heat the CNG, so the cooling system 150 cools the compressed CNG to a desired temperature (e.g., around −78.5° C.). Cold CNG then travels through the remainder of the passageway 110 to the port 120*a* and vessels 400. The filling of the vessels 400 of the unit 120 with CNG displaces hydraulic fluid downwardly and out of the vessels 400 via the hydraulic fluid port 120*b*. The displaced hydraulic fluid empties into the reservoir 170 via the passageways 200, 190 and pressure-controlled valve 195. The pressure-controlled valve 195 only permits hydraulic fluid to flow out of the vessels 400 when the vessel 400 pressure (e.g., as sensed by the valve 195 in the passageway 200) exceeds a predetermined value (e.g., at or slightly above a desired vessel 400 pressure).

CNG Transfer From Source Facility To Vehicle

Hereinafter, the transfer of CNG from the source facility 20 to the vehicle 30 is described with reference to FIG. 1. The connector 130 is attached to the connector 300, and the connector 270 is attached to the connector 350. The vessels 400 of the unit 320 are full of pressurized hydraulic fluid so that the vessels 400 are maintained at or around a desired pressure. The unit 320 can be filled with CNG from the unit 120 and/or directly from the source 60. With respect to CNG delivery directly from the source 60, CNG from the source 60 proceeds to the unit 320 in the same manner as described above with respect to the filling of the unit 120, except that the CNG continues on through the passage 110 across the connectors 130, 300, through the passageway 310, and to the pressure-controlled valve 330. CNG can simultaneously or alternatively be delivered to the vehicle 30 from the unit 120. To do so, the pump 180 delivers pressurized hydraulic fluid to the vessels 400 of the unit 120, which displaced CNG out through the port 120*a*, through the passageway 110, across the connectors 130, 300, through the passageway 310, and to the pressure-controlled valve 330. When CNG pressure in the passageway 310 exceeds a set point of the valve 330 (e.g., a set point at or above the desired pressure of the vessels 400 of the unit 320), the valve 330 opens, which causes cold CNG to flow into the vessels 400 of the unit 320 of the vehicle 30. This flow of CNG into the unit 320 displaces hydraulic fluid out of the vessels 400 of the unit 320 through the port 320*b*, passageway 340, connectors 350, 270, passageway 260 and to the pressure-controlled valve 250. When the pressure in the passageway 260 exceeds a set point of the valve 250 (e.g., a set point at, near, or slightly below the desired pressure of the vessels 400 of the unit 320), the valve 250 opens to allow hydraulic fluid to flow through the passageway 230 into the reservoir 170. When the vessels 400 of the unit 320 have been filled with CNG, the appropriate valves are shut off, the connectors 300 and 350 are disconnected from the connectors 130, 270, respectively, and the vehicle 30 can travel to its destination facility 40. According to various embodiments, liquid sensor(s) may be disposed in the various passageways and/or at the upper/top and lower/bottom of the vessels 400 so as to indicate when the vessels 400 have been emptied or filled with CNG or hydraulic fluid. Such liquid sensors may be configured to trigger close the associated gas/hydraulic fluid transfer valves to stop the process once the process has been completed.

The use of the storage buffer created by the cold storage unit 120 may facilitate the use of smaller, cheaper compressor(s) 90 and/or faster vehicle 30 filling than would be appropriate in the absence of the unit 120. This may reduce the vehicle 30's idle time and increase the time during which the vehicle 30 is being actively used to transport gas (e.g., obtaining better utilization from each vehicle 30). Small compressors 90 may continuously run to continuously fill the unit 120 with CNG at the desired pressure and temperature, even when a vehicle 30 is not available for filling. In that manner, the compressors 90 do not have to compress all CNG to be delivered to a vehicle 30 while the vehicle 30 is docked with the source facility 20. Real-time direct transfer from a low-pressure source 60 to a vehicle 30 without the use of the buffer unit 120 would require larger, more expensive compressors 90 and/or a significantly longer time to fill the unit 320 of the vehicle 30.

Destination Facility

Hereinafter, the structural components of non-limiting examples of the destination facility 40 are described with reference to FIG. 2. A gas delivery connector 500 connects to a gas delivery passageway 510, which, in turn, connects to one or more intermediate or end CNG destinations, including, for example, a gas port 520*a* of a destination buffer cold storage unit 520, a CNG power generator 530, a filling station 540 for CNG-powered vehicles, a filling station 550 for CNG trailers 560 (which may be of the type described in PCT Publication No. WO2014/031999, the entire contents of which are hereby incorporated by reference), and/or an LNG production and distribution plant 570 for LNG trailers 580, a delivery passageway 590 to a low-pressure CNG pipeline disposed downstream from an expander 600 of the LNG plant 570, among other destinations.

According to various non-limiting embodiments, the CNG power generator 530 may comprise a gas turbine that could have power and efficiency augmentation in a warm humid climate by using the cold expanded natural gas to cool the inlet air and also extract humidity. If a desiccant dehydration system is to be used, waste heat from the turbine of the generator 530 (e.g., exhaust from a simple cycle turbine or the condensing steam after the bottoming cycle in CCGT) can be used (e.g., to heat the gas flowing through the passageway 510 to any destination user of gas).

According to various non-limiting embodiments, the LNG plant 570 may use a crossflow heat exchanger and supporting systems to use the expansion-cooling to generate LNG without an additional parasitic energy load, for example.

As shown in FIG. 2, the destination facility includes a hydraulic fluid connector 610 that detachably connects to the connector 350 of the vehicle 30. A passageway 620 connects the connector 610 to a hydraulic fluid reservoir 630. Two pumps 640, 650 and a pressure-controlled valve 660 are disposed in parallel to each other in the passageway 620.

The pump 650 may be a reversible pump (e.g., a closed loop pump) that can absorb energy from the pressure let-down (e.g., when hydraulic fluid is transferred from the vessel 400 of the vehicle 30 to the reservoir 630, which can occur, for example, when a nitrogen ballast system is used, as explained below). The valve 660 may be used to control the pressure in the vessel 400 of the vehicle 30 by permitting hydraulic fluid to flow back into the reservoir 630 when the valve 660 senses that a pressure in the vessel 400 exceeds a predetermined value.

As shown in FIG. 2, a hydraulic fluid port/connector 520*b* of the cold storage unit 520 connects to the hydraulic fluid reservoir 630 via a passageway 670. A pump 680 and pressure-controlled valve 690 are disposed in parallel with each other in the passageway 670.

Use Of Destination Facility Buffer Cold Storage Unit

According to various embodiments, the buffer cold storage unit 520 provides CNG to the various destination users 530, 540, 550, 560, 570, 590 when CNG is not being provided directly from a vehicle 30. The pressure within the vessels 400 of the unit 520 is monitored by pressure sensors. When the sensed pressure within the vessel(s) 400 of the unit 520 deviates from a desired pressure by more than a predetermined amount (e.g., 5, 10, 20, 30, 40, 50, 60, 70, 80, 90, 100, 150, 200, 250, 300, 350, or more psi; 1, 2, 3, 4, 5, 6, 7, 8, 9, 10, and/or more % of the desired pressure (in psig terms)), the pump 680 pumps hydraulic fluid from the reservoir 630 into the vessels 400 of the unit 400 so as to maintain a pressure within the vessels 400 of the unit 520 to consistently stay within a desired pressure range. Thus, pressurized hydraulic fluid displaces the CNG being depleted from the vessels 400 of the unit 520.

CNG Transfer From Vehicle 30 To Destination Facility 40

Hereinafter, delivery of CNG from the vehicle 30 to the destination facility 40 is described with reference to FIG. 2. When the vehicle 30 arrives at the destination facility 40, the vessels 400 of the destination cold storage unit 520 typically partially or fully filled with hydraulic fluid. The vehicle 30 docks with the destination facility 40 by connecting the connector 300 to the connector 500 and by connecting the connector 350 to the connector 610. The pump 640 pumps hydraulic fluid from the reservoir 630 into the vessels 400 of the unit 320 of the vehicle 30 (see FIG. 1 for details), which forces CNG out of the vessels 400 of the unit 320 of the vehicle 30, through the connectors 300, 500, and into the passageway 510, where CNG is delivered to the buffer storage unit 520 and/or one or more of the above-discussed destinations 530, 540, 550, 560, 570, 580, 590. The pressure controlled valve 330 of the vehicle 30 (see FIG. 1), may only allow CNG to transfer from the vehicle 30 to the destination facility 40 when a pressure in the vessels 400 of the unit 320 exceeds a predetermined threshold (e.g., at or above the designed operating pressure of the vessels 400 of the unit 320). In this way, a pressure within the vessels 400 of the unit 320 is consistently maintained at or near a desired pressure.

Miscellaneous Features Of CNG Storage And Transfer System

As shown in FIGS. 1-2, a variety of additional valves 695 (not all shown) are disposed throughout the passageways of the source facility 20, vehicle 30, and destination facility 40. These valves 695 are opened and closed as desired (e.g., manually or automatically (e.g., pressure-controlled valves)) to facilitate fluid (e.g., CNG, hydraulic fluid) flow along the desired pathways and/or to prevent fluid flow along non-desired pathways for particular operating conditions (e.g., filling the unit 120 with CNG from the source 60; filling the unit 320 with CNG from the source facility 20; transferring CNG from the unit 320 to the destination facility 40).

The transfer of CNG and/or hydraulic fluid between the various facilities 20, 30, 40, storage units 120, 320, 520, vessels 400, and destination users 530, 540, 550, 560, 570, 590 may be manual, or it may be partially or fully automated by one or more control systems. The control systems may include a variety of sensors (e.g., pressure, temperature, mass flow, etc.) that monitor conditions throughout or in various parts of the system 10. Such control systems may responsively control the CNG/hydraulic fluid transfer process (e.g., by controlling the valves, pumps 180, 240, 640, 650, 680, compressors 90, coolers 150, 155, 430, heaters, etc.).

Such control systems may be analog or digital, and may comprise computer systems programmed to carry out the above-discussed CNG transfer algorithms.

Vehicle-Based Hydraulic Fluid Reservoir

In the above-described system 10, the hydraulic fluid reservoirs 170, 630 are disposed at the source and destination facilities 20, 40. Use of the system 10 will gradually shift hydraulic fluid from the reservoir 630 at the destination facility 40 to the reservoir 170 at the source facility 20. To account for such depletion, hydraulic fluid can periodically be transferred (e.g., via a vehicle) back from the reservoir 170 of the source facility 20 to the reservoir 630 of the destination facility.

Figure 4:
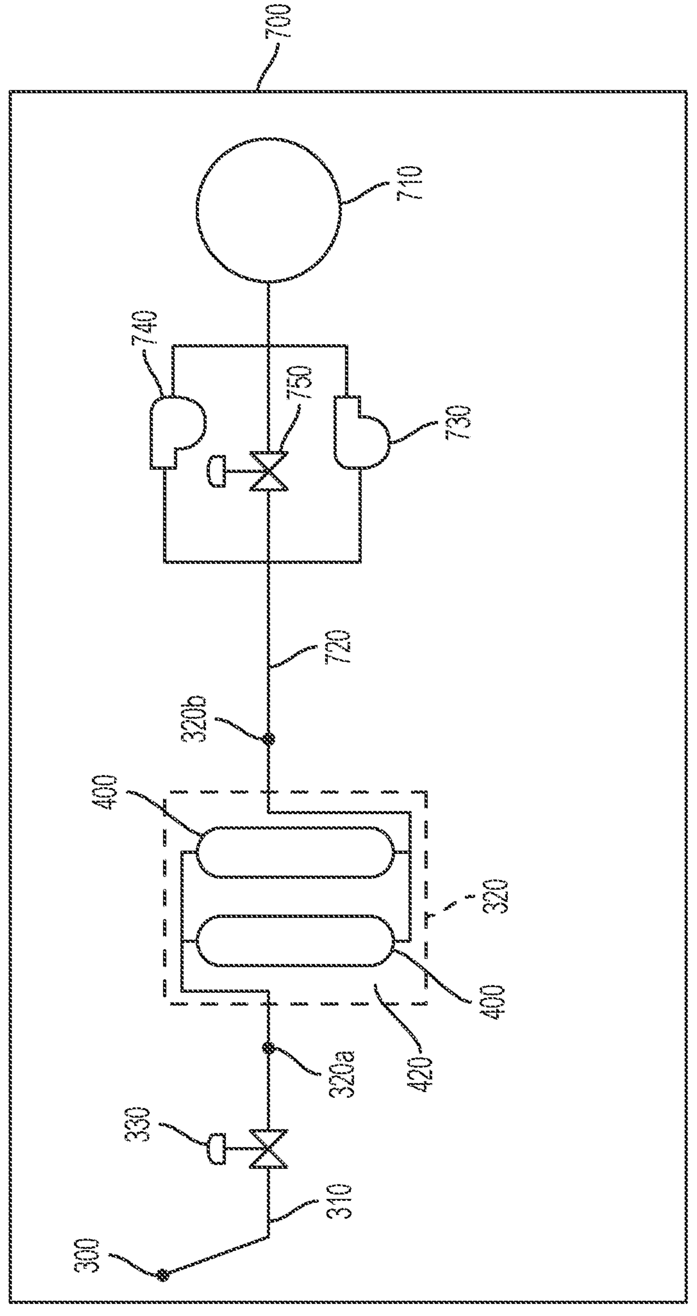
FIG. 4 is a diagrammatic view of a CNG transportation vehicle according to one or more embodiments.

According to one or more alternative embodiments, as illustrated in FIG. 4, the system 10 is modified to replace the vehicle 30 with a vehicle 700, which is generally similar to the vehicle 30, so a redundant description of similar components is omitted. The vehicle 700 differs from the vehicle 30 by adding a vehicle-born hydraulic fluid reservoir 710 that connects to the hydraulic fluid port **320*b* of the unit 320 via a passageway 720. Two pumps 730, 740 and a press-regulated valve 750 are disposed in parallel to each other in the passageway 720. The reservoir 710 has sufficient capacity and hydraulic fluid to completely fill the vessels 400 of the unit 300**.

According to various embodiments, the hydraulic fluid reservoir 710 and/or other parts of the vehicle 700 (e.g., the passageway 720, pumps 730, 740, and valve 750) may be disposed within the cooled/insulated space 420 of the unit 320. The reservoir 710 may be disposed in a vessels that is contoured to fit within interstitial spaces between the vessels 400 of the vehicle 700. The refrigeration unit 430 may deposit solid CO2 into spaces between and around the vessels 400, reservoir 710, and any other components that are disposed within the space 420 of the vehicle 700.

During transfer of CNG from the source facility 20 to the vehicle 700, the reservoir 710, passageway 720, and valve 750 work in the same manner as the above discussed reservoir 170, passageways 340, 260, 230 and valve 250. During transfer of CNG from the vehicle 700 to the destination facility 40, the reservoir 710, passageway 720, and pump 740 work in the same manner as the above-described reservoir 630, passageway 620, and pump 640. Use of the vehicle 700 avoids the repeating transfer of hydraulic fluid from the destination facility 40 to the source facility 20.

As a result, the vehicle 700 travels from the source facility 20 to the destination facility 40 with hydraulic fluid disposed predominantly in the reservoir 710 and CNG in the vessels 400. When the vehicle 700 travels to the source facility 20 from the destination facility 40, the vessels 400 are filled with hydraulic fluid and the reservoir 710 may be predominantly empty.

Figure 5:
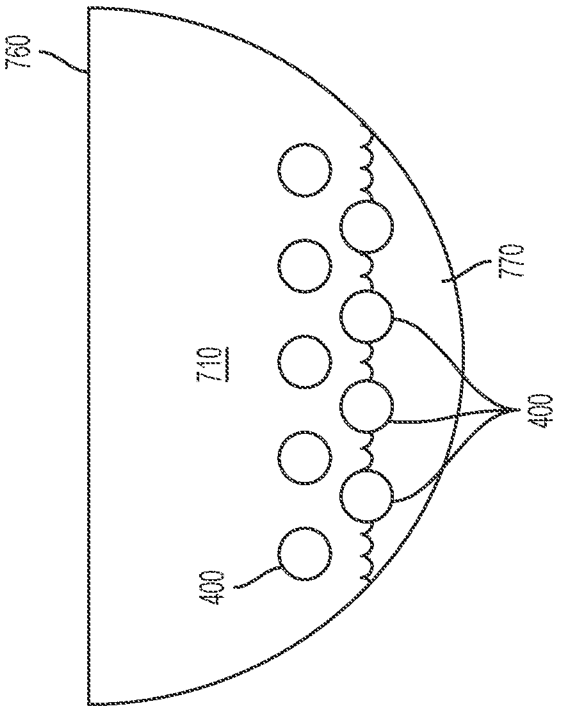
FIG. 5 is a diagrammatic side view of a CNG transportation ship according to one or more embodiments.

FIG. 5 illustrates an alternative vehicle 760, which is generally similar to the vehicle 700, except as discussed below. Unlike with the cold storage unit 320 of the vehicles 30, 700, the vessels 400 of the vehicle 760 are not refrigerated, so the vessels 400 of the vehicle 760 may be at ambient temperatures. The hydraulic reservoir 710 of the vehicle 760 is formed in the interstitial spaces between and around the vessels 400 so that the hydraulic fluid 770 fills this interstitial space.

Nitrogen Ballast

According to an alternative embodiment, the vessels 400 of the vehicle 30 are filled with compressed nitrogen at the destination facility 40, so that nitrogen, rather than hydraulic fluid, is used as a pressure-maintaining ballast during the vehicle 30's return trip from the destination facility 40 to the source facility 20 (or another source facility 20).

The nitrogen ballast is provided by a nitrogen source (e.g., an air separation unit combined with a compressor and cooling system to cool the compressed nitrogen to at or near the cold storage temperature). The nitrogen source delivers cold, compressed nitrogen to a nitrogen delivery connector that can be connected to the connector 300 of the vehicle 30 (or a separate nitrogen-dedicated connector that connects to the vessel 400 of the vehicle 30).

In various nitrogen ballast embodiments, CNG is unloaded from the vehicle 30 to the destination facility 40 as described above, which results in the vessels 400 being filled with hydraulic fluid. At that point, the connector 500 can be disconnected from the connector 300 of the vehicle 30, and the outlet connector of the nitrogen source is connected to the connector 300 of the vehicle 30. Cold compressed nitrogen is them injected into the vessels 400 while hydraulic fluid is displaced out of the vessels 400 in the same or similar manner that CNG was transferred to the vessels 400 at the source facility 20, all while maintaining the vessels 400 at or near their desired storage pressure and temperature so as to minimize stresses on the vessels 400. Once the hydraulic fluid is evacuated from the vessels 400, the vehicle 30's connectors 300, 350 are separated from the destination facility connectors and the vehicle 30 can return to the source facility 30.

At the source facility 20, hydraulic fluid is injected into the vessels 400 (e.g., via the pump 240) from the reservoir 170 to displace the nitrogen ballast, which can either be vented to the atmosphere or collected for another purpose. The vehicle 30 is then filled with CNG from the source facility 20 in the manner described above.

In the above-described embodiment, hydraulic fluid is filled into the vessels 400 between when the vessels 400 are emptied of one of CNG or nitrogen and filled with the other of CNG or nitrogen. The intermediate use of hydraulic fluid as a flushing medium discourages, reduces, and/or minimizes the cross-contamination of the CNG and nitrogen. According to various embodiments, some mixing of nitrogen into the CNG is acceptable, particularly because nitrogen is inert. However, according to various alternative embodiments, a piston or bladder may be included in the vessels 400 to maintain a physical barrier between the CNG side of the piston/bladder and the ballast side of the piston/bladder. In such an alternative embodiment, the intermediate hydraulic fluid flush can be omitted.

According to various embodiments, the use of such a nitrogen ballast system can avoid the need for the vehicle 30 to transport hydraulic fluid from the destination facility 40 back to the source facility 20, while still maintaining the vessels 400 at the desired pressure.

Reduced Vessel Fatigue

The use of pressurized hydraulic fluid and/or other ballast fluid during the above-discussed CNG transfer process into and out of the vessels 400 enables the pressure within the vessels 400 of the units 120, 320, 520 to be consistently maintained at or around a desired pressure (e.g., within 30, 20, 10, 9, 8, 7, 6, 5, 4, 3, 2, and/or 1% of a psig set point (e.g., a certain pressure); within 1000, 500, 400, 300, 250, 200, 150, 125, 100, 75, 50, 40, 30, 20, and/or 10 psi of a psig set point (e.g., a certain pressure)). According to various embodiments, the set point/certain pressure is (1) at least 1000, 1100, 1200, 1300, 1400, 1500, 1600, 1700, 1800, 1900, 2000, 2250, 2500, 3000, 3500, 4000, 4250, 4500, and/or 5000 psig, (2) less than 10000, 7500, 7000, 6500, 6000, 5500, 5000, 4750, and/or 4500, (3) between any two such values (e.g., between 2500 and 10000 psig, between 2500 and 5500 psig, and/or (4) about 2500, 3000, 3500, 3600, 4000, and/or 4500 psig. According to various non-limiting embodiments, the vessels 400 therefore remain generally isobaric during the operational lifetime. According to various non-limiting embodiments, maintaining the vessel 400 pressure at or around a desired pressure tends to reduce the cyclic stress fatigue that plagues pressure vessels that are repeatedly subjected to widely varying pressures as they are filled/loaded and emptied/unloaded.

According to various embodiments, various transfers of CNG into the vessel 400 results in hydraulic fluid occupying less than 10, 9, 8, 7, 6, 5, 4, 3, 2, and/or 1% of an internal volume of the vessel 400. According to various embodiments, before such transfers, hydraulic fluid occupied at least 75, 80, 85, 90, 95, and/or 99% of a volume of the vessel. According to various embodiments, a volume of hydraulic fluid in the vessel 400 before the transfer exceeds a volume of hydraulic fluid in the vessel 400 after such transfer by least 30, 40, 50, 60, 70, 80, 90, 95, and/or 99% of an internal volume of the vessel 400.

Vessel Structure

Figure 6:
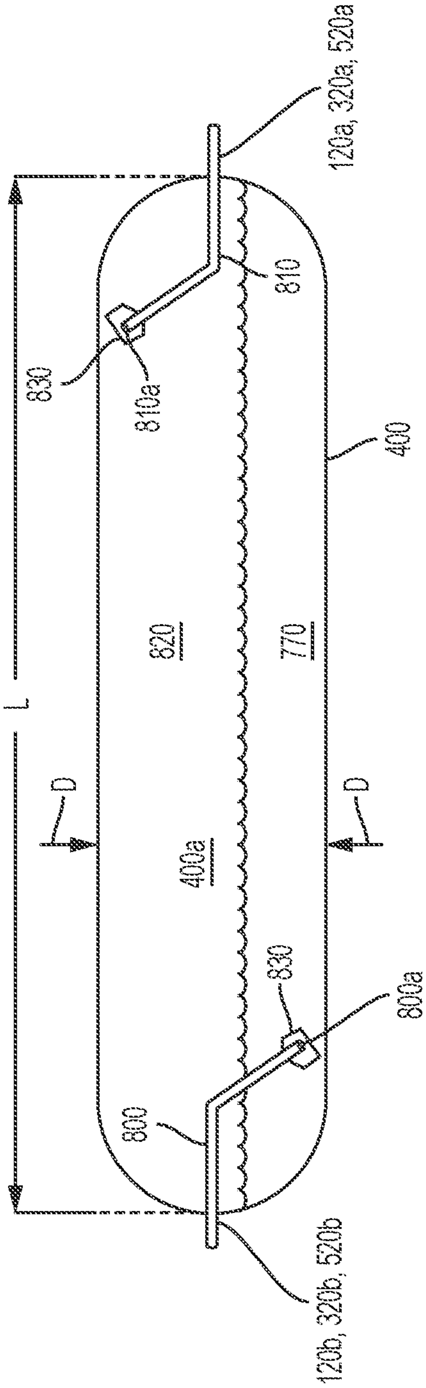
FIG. 6 is a diagrammatic side view of a CNG vessel according to one or more embodiments.

According to various non-limiting embodiments, the reduced fatigue on the vessels 400 facilitates (1) a longer useful life for each vessel 400, (2) vessels 400 that are built to withstand less fatigue (e.g., via weaker, lighter, cheaper, and/or thinner-walled materials), and/or (3) larger capacity vessels 400. According various embodiments, and as shown in FIG. 6, various of the vessels 400 are generally tubular/cylindrical with bulging (e.g., convex, hemispheric) ends. According to various non-limiting embodiments an outer diameter D of the vessel 400 is (1) at least 2, 3, 4, 5, 6, 7, 8, 9, 10, 11, 12, 13, 14, 15, 20, 25, 30, 35, 40, 45 and/or 50 feet, (2) less than 100, 75, 50, 40, 30, 25, 20, 15, 10, 9, and/or 8 feet, and/or (3) between any two such values (e.g., between 2 and 100 feet, between 2 and 8 feet, between 4 and 8 feet, about 7.5 feet). According to various non-limiting embodiments, a length L of the vessel 400 is (1) at least 5, 8, 10, 15, 20, 30, 40, 50, 60, 70, 80, 90, 100, 125, 150, 175, 200, 250, 500, 750, and/or 1000 feet, (2) less than 1250, 1000, 750, 500, 250, 200, 175, 150, 125, 100, 75, 70, 60, 50, 40, 30, and/or 20 feet, and/or (3) between any two such values (e.g., between 5 and 1250 feet, about 8.5, 18.5, 28.5, 38.5, 43.5, 46.5, and/or 51.5 feet). According to various embodiments, a ratio of L:D is (1) at least 3:1, 4:1, 5:1, 6:1, 7:1, and/or 8:1, (2) less than 15:1, 14:1, 13:1, 12:1, 11:1, 10:1, 9:1, 8:1, 7:1, and/or 6:1, and/or (3) between any two such upper and lower values (e.g., between 3:1 and 15:1, between 4:1 and 10:1). According to various embodiments, the diameters and lengths of the vessels 400 may be tailored to the particular use of the vessels 400. For example, longer and/or larger diameter vessels 40 may be appropriate for the storage unit 320 of a large vehicle 30 such as a large ocean-going ship in which a substantial portion of the ship's cargo area is devoted to the storage unit 320.

According to various embodiments, each vessel 400 may be a low-cycle intensity pressure vessel (e.g., used in applications in which the number of load/unload cycles per year is less than 400, 300, 250, 225, and/or 200).

According to various embodiments, an interior volume of an individual vessel 400 is (1) at least 1,000, 5,000, 7,500, 8,000, 9,000, 10,000, 12,500, 15,000, 17,500, 20,000, 25,000, 30,000, 40,000, and/or 50,000 liters, (2) less than 100,000, 50,000, 25,000, 20,000, and/or 15,000 liters, and/or (3) between any two such upper and lower volumes (e.g., between 1,000 and 100,000 liters, between 10,000 and 100,000 liters).

As shown in FIG. 6, if the vessels 400 are to be disposed horizontally in their unit 120, 320, 520 (i.e., such that an axis of their tubular shape is generally horizontally disposed), hydraulic fluid and CNG dip tubes 800, 810 may be used to generally ensure that heavier hydraulic fluid 770 flows only out of the dip tube 800 and connected hydraulic port 120*b*, 320*b*, 520*b* and that lighter CNG 820 flows only out of the dip tube 810 to the port 120*a*, 320*a*, 520*a*. As shown in FIG. 6, the hydraulic fluid dip tube 800 bends downwardly within the volume 400*a* of the vessel 400 such that its end opening 800*a* is disposed at or near a gravitational bottom of the volume 400*a*. Conversely, the CNG dip tube 810 bends upwardly within the volume 400*a* of the vessel such that its end opening 810*a* is disposed at or near a gravitational top of the volume 400*a*. According to various embodiments, the vessel 400 may be slightly tilted relative to horizontal (counterclockwise as shown in FIG. 6) so as to place the end opening 800*a* closer to the gravitational bottom of the volume 400*a* and to place the end opening 810*a* closer to the gravitational top of the volume 400*a*.

As shown in FIG. 6, protective impingement deflectors 830 (e.g., plates) are disposed just past the end openings 800*a*, 810*a* of the dip tubes 800, 810. The deflectors 830 may be mounted to the dip tubes 800, 810 or to the adjacent portions of the vessels 400 (e.g., the interior surface of the vessel 400 adjacent to the opening of the dip tube 800, 810. Flow of fluid (e.g., CNG 820, hydraulic fluid 770) into the vessel volume 400*a* via the dip tubes 800, 810 and openings therein tends to cause the fluid to impinge upon the internal walls/surfaces of the vessel 400 that define the volume 400*a*, which can erode and damage the vessel 400 walls. The impingement deflectors 830 are disposed between the openings 800*a*, 810*a* and the adjacent vessel 400 walls so that inflowing fluid 770, 820 impinges upon the deflectors 830, instead of the vessel 400 walls. The deflectors 830 therefore extend the useful life of the vessels 400.

While the above-discussed embodiments maintain the vessels 400 at a relatively consistent pressure, such pressure maintenance may be omitted according to various alternative embodiments. According to various alternative embodiments, the hydraulic fluid reservoirs, pumps, nitrogen equipment, and/or associated structures are eliminated. As a result, the pressures in the vessels 400 drop significantly when the vessels 400 are emptied of CNG, and rise significantly when the vessels 400 are filled with CNG. According to various embodiments, these pressure fluctuations result in greater fatigue, which may result in (1) a shorter useful life for each vessel 400, (2) the use of vessels 400 that are stronger and more expensive, and/or (3) the use of smaller capacity vessels 400.

When the vessels 400 are disposed horizontally, their middle portions tend to sag downwardly under the force of gravity. Accordingly, longitudinally-spaced annular hoops/rings 850 may be added to the cylindrical portion of the vessels 400 to provide support. According to various embodiments, the rings 850 comprise 3.5% nickel steel (e.g., when the cold storage temperate is around −78.5° C.). According to various non-limiting embodiments, for vessels designed for warmer temperatures (e.g., −50° C.), less expensive steels (e.g., A333 or impact tested steel) may be used. A plurality of circumferentially-spaced tension bars 860 extend between the hoops 850 to pull the hoops 850 toward each other. The bars 860 may be tensioned via any suitable tensioning mechanism (e.g., threaded fasteners at the ends of the bars 860; turn-buckles disposed along the tensile length of the bars 860; etc.). In the illustrated embodiment, two hoops 850 are used for each vessel 400. However, additional hoops 850 may be added for longer vessels 400. The hoops 850 and tension bars 860 tend to discourage the vessel 400 from sagging, and tend to ensure that the ends of the vessel 40 to not bend, which might adversely affect rigid fluid passageways connected to the ends of the vessel 400.

According to various embodiments, a membrane/liner of the vessel 400 may be supported by balsa wood or some other structural support that is not impermeable but can provide a mechanical support upon which the membrane conforms to.

Figure 7:
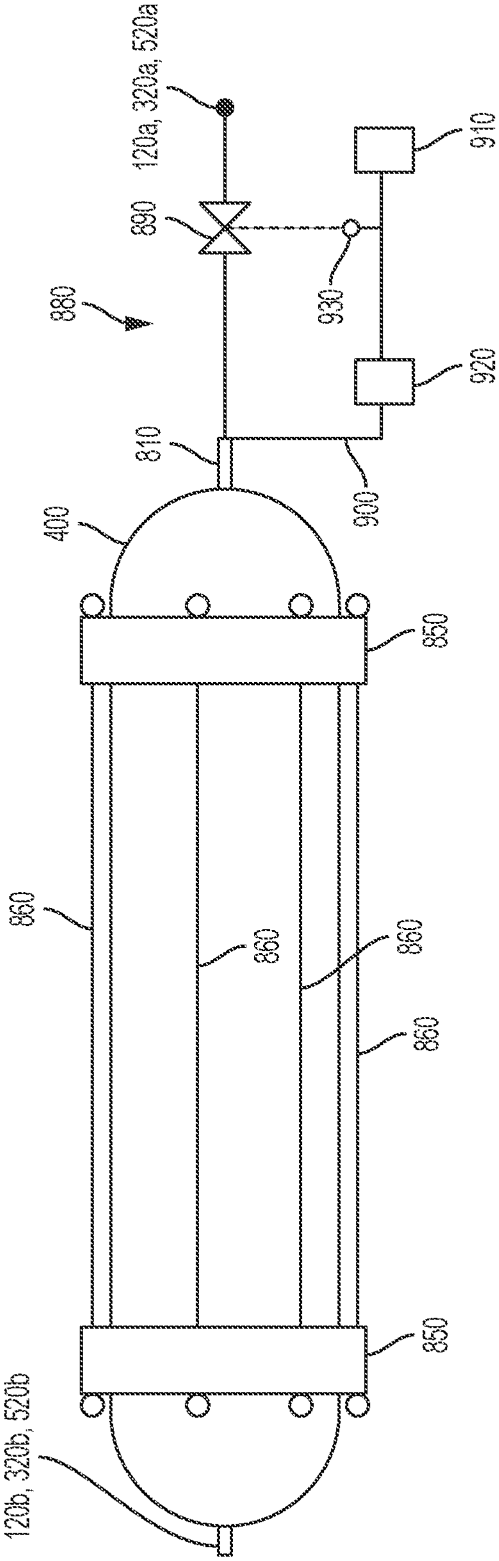
FIG. 7 is a diagrammatic side view of a CNG vessel and burst prevention system according to one or more embodiments.

As shown in FIG. 7, the vessels 400 may incorporate a burst-avoidance system 880 disposed between the dip tube 810 and port 120*a*, 320*a*, 520*a*. The system 880 includes a normally-open valve 890 disposed in the passageway connecting the dip tube 810 to the port120*a*, 320*a*, 520*a* (or anywhere else along the CNG passageway connected to the volume 400*a* of the vessel). The system 880 also includes a passageway 900 that fluidly connects the volume 400*a* (e.g., via the dip tube 810) to a vent 910 (e.g., to a safe atmosphere, etc.). A burst object 920 (e.g., a disc of material) is disposed in the passageway 900. The burst object blocks the passageway 900 and prevents fluid flow from the vessel volume 400*a* to the vent 910. The burst object 920 is made of a material with a lower and/or more predictable failure point than the material of the vessel 400 walls. For example, the burst object 920 may be made of a material that is identical to, but slightly thinner than, the walls of the vessel 400. The burst object 920 and vessel 400 walls are subjected to the same pressures and fatigues as the vessel 400 is used. As both the vessel 400 walls and burst object 920 weaken with use, the burst object 920 will fail before the vessel 400 walls. When the burst object 920 fails, fluid from the vessel 400 passes by the failed burst object within the passageway 900 and is safely vented out of the vent 910. A pressure or flow sensor 930 is operatively connected to the valve 890 and is disposed in the passageway 900 between the burst object 920 and vent 910 detects the flow of fluid therethrough as a result of the burst object 920 failure. The detection of such flow by the sensor 930 triggers the valve 890 to close. Alarms may also be triggered. The vessel 400 can then be safely replaced.

Figure 8:
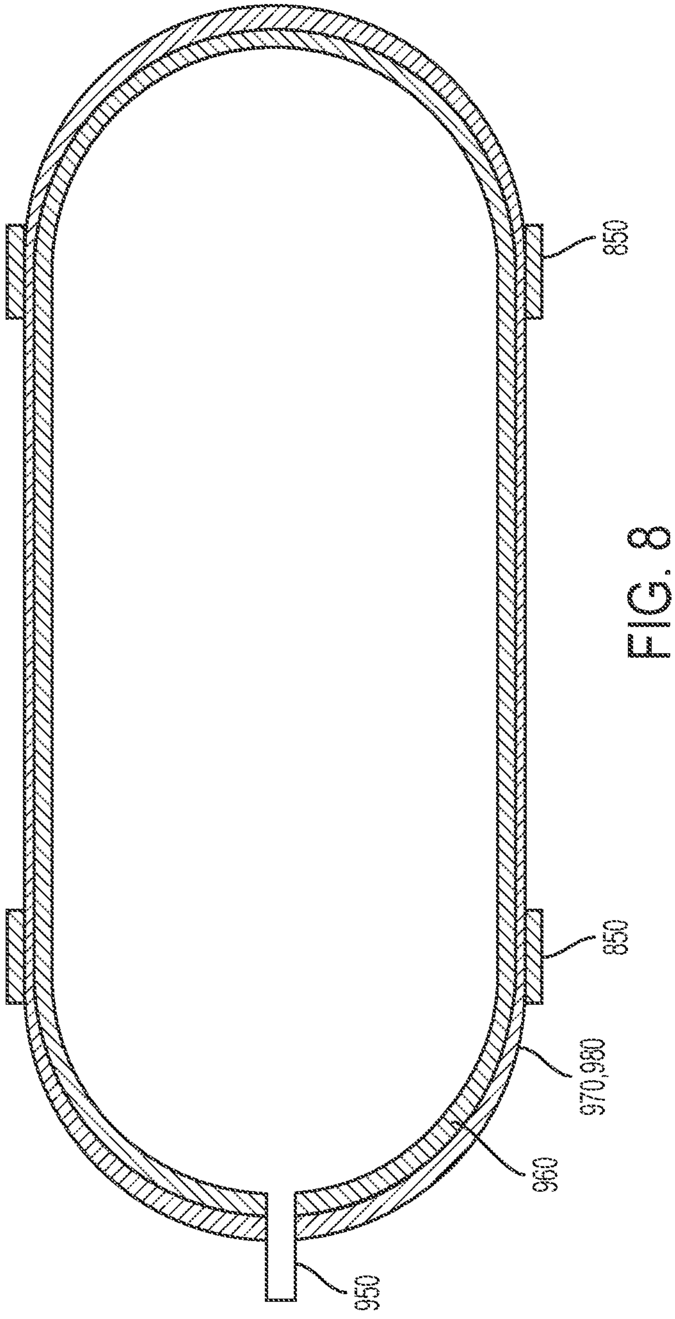
FIG. 8 is a cross-sectional side view of a CNG vessel during its construction according to one or more embodiments.

According to various embodiments, and as shown in FIG. 8, the vessels 400 may be manufactured by first inflating a bladder 950 that has the intended shape of the volume 400*a*. A liner 960 is then formed on the inflated bladder. For vessels 400 intended to be used at ambient temperatures (e.g., well warmer −78.5° C.), the liner 960 may be formed from a material such as HDPE. According to various embodiments in which the working temperature of the vessel 400 and its contents is colder (e.g., −78.5° C.), ultra-high molecular weight polyethylene (UHMWPE) may be used, since such material has good strength properties at such low temperatures. According to various non-limiting embodiments, the liner 960 is (a) less than 10, 9, 8, 7, 6, 5, 4, 3, and/or 2 mm thick, (b) at least 0.5, 1.0, 1.5, 2.0, and/or 2.5 mm thick, and/or (c) between any two such values (e.g., between 0.5 and 10 mm thick). According to various non-limiting embodiments, thinner liners 960 are used for vessels 400 that are not subjected to severe pressure fatigue (e.g., embodiments in which hydraulic fluid or nitrogen is used to maintain a consistent pressure in the vessel 400). According to various non-limiting embodiments, for very large diameter and/or thick walled vessels 400, the anti-permeation properties of the composite resin used with the fiberglass and/or carbon fiber layers may be enough to pass permeation test requirements even in the absence of a liner, in which case the liner may be omitted. According to various non-limiting embodiments, when the vessels 400 are Type 5 vessels 400, the liner may be omitted.

A full fiberglass layer 970 is then built up around the liner 960 while the inflated bladder 950 supports the liner 960.

Figure 9:
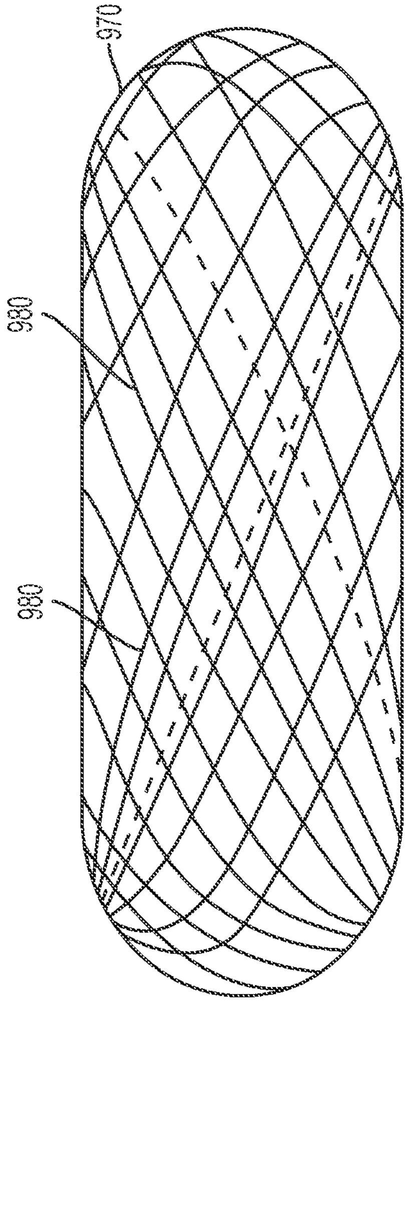
FIG. 9 is a side view of a CNG storage vessel according to one or more embodiments.

As shown in FIG. 9, a carbon fiber layer 980 is added to strengthen critical portions of the vessel 400. For example, carbon fiber 980 is wrapped diagonally from an edge of the hemispheric shape on one side of the liner 960 to a diagonal edge of the hemispheric shape on the other side of the liner 960. According to various embodiments, the carbon fiber layer 980 may be wrapped before, during, or after the fiberglass layer 970 is formed.

After wrapping, the bladder 950 can then be deflated and removed. The dip tubes 800, 810 can then be sealingly added to form the vessels 400.

According to various embodiments, the fiberglass layer 970 is homogeneous with fiberglass extending in all directions. Conversely, the carbon fiber layer 980 is non-homogeneous, as the carbon fiber 980 extends predominantly only in the diagonal or parallel direction illustrated in FIG. 9. According to various embodiments, in smaller diameter pressure vessels 400, the carbon fiber may be wrapped only along the diagonals, but in larger diameter pressure vessels 400, the carbon fiber may form complete, homogeneous layer. According to various embodiments, a smaller diameter vessel 400 may having 5-6 layers of carbon fiber, while a larger diameter vessel 400 may utilize 20 or more layers of carbon fiber.

According to various embodiments, a mass-based ratio of fiberglass:carbon-fiber in the vessel 400 is at least 3:1, 4:1, 5:1, 6:1, 7:1, 8:1, 9:1, 10:1, 11:1, 12:1, 13:1, 14:1, 15:1, and/or 20:1.

After wrapping of the layers 970 and/or 980, the vacuum may be pulled on the wrapped layers 970 and/or 980 to press the layers 970 and/or 980 against the liner 960 and prevent void spaces between the liner 960 and layers 970 and/or 980.

A resin may then be applied to the layers 970, 980 to set the layers 970, 980 in place and strengthen them. According to various embodiments, the resin is an ambient temperature cure resin that is nonetheless designed to operate at the designed operating temperatures of the vessels 400 (e.g., −78.5° C. for embodiments utilizing cold storage units 120, 320, 520; ambient temperatures for embodiments not relying on cold storage).

According to various non-limiting alternative embodiments, the fiberglass and/or carbon fiber may be impregnated with resin before application to the vessel 400 being created (e.g., during manufacturing of the fibers) in a process known as wet winding.

According to various embodiments, the hybrid use of fiberglass and carbon fiber to construct the vessel 400 balances the cost advantages of inexpensive fiberglass 970 (relative to the cost of carbon fiber 980) with the weight, strength, and/or fatigue-resistance advantages of carbon fiber 980 (relative to lower strength, heavier, and less fatigue resistant fiberglass 970).

According to various non-limiting embodiments, the use of carbon fiber improves the fire safety of the vessel 400 due to improved heat conduction/dissipation inherent to carbon fibers in comparison to less conductive materials such as glass fiber. The heat conductivity of the carbon fiber may trigger an exhaust safety valve (thermally actuated) faster than less conductive materials.

According to various regulations (e.g., EN-12445), a pressure vessel's maximum working pressure depends on the vessel material. For example, the failure strength of a steel pressure vessel may be required to be 1.5 times its maximum working pressure (i.e., a 1.5 factor of safety). Carbon fiber pressure vessels may require a 2.25 to 3.0 factor of safety for operating pressures. Fiberglass pressure vessels may require a 3.0 to 3.65 factor of safety, which may force manufacturers to add extra, thick, heavy layers of fiberglass to fiberglass-based pressure vessels. According to various embodiments, the hybrid fiberglass/carbon-fiber vessel 400 can take advantage of the lower carbon fiber factor of safety because the most fatigue-vulnerable portion of the vessel 400 is typically the corner-to-corner strength (but may be additionally and/or alternatively in other directions), and that portion of the vessel 400 is strengthened with carbon fiber 980.

According to various embodiments, reinforcing annular rings such as the rings 850 shown in FIG. 8 may be added to the vessels 400 before, during, or after the fiberglass and/or carbon fiber layers 970, 980 are added. Accordingly, the reinforcing rings 850 may be integrated into the reinforcing fiber structure 970, 980 of the vessel 400. According to various embodiments, the rings 850 may tend to prevent catastrophic bursts of the vessels 400 by stopping the progression of a rip in the liner 960. In particular, rips in cylinder-shaped vessels such as the vessel 400 tend to propagate along the longitudinal direction (i.e., parallel to an axis of the cylindrical portion of the vessel 400). As shown in FIG. 7, the reinforcing rings 850 extend in a direction perpendicular to the typical rip propagation direction. As a result, the rings 850 tends to prevent small longitudinal rips in the liner 960 from propagating into large and/or catastrophic ruptures.

According to various embodiments, reinforcing rings 850 may be added before the fiberglass and/or carbon fiber layers 970, 980 so as to help support the hemispherical ends/heads during wrapping of the fiberglass and/or carbon fiber layers 970, 980. The reinforcing rings 850 may also make circular wrapping of the cylindrical body easier by providing support points.

According to various embodiments, a metal boss may be used to join the CNG dip tubes 800, 810 (or other connectors) to a remainder of the vessels 400.

Refrigeration Jacket

Figure 10:
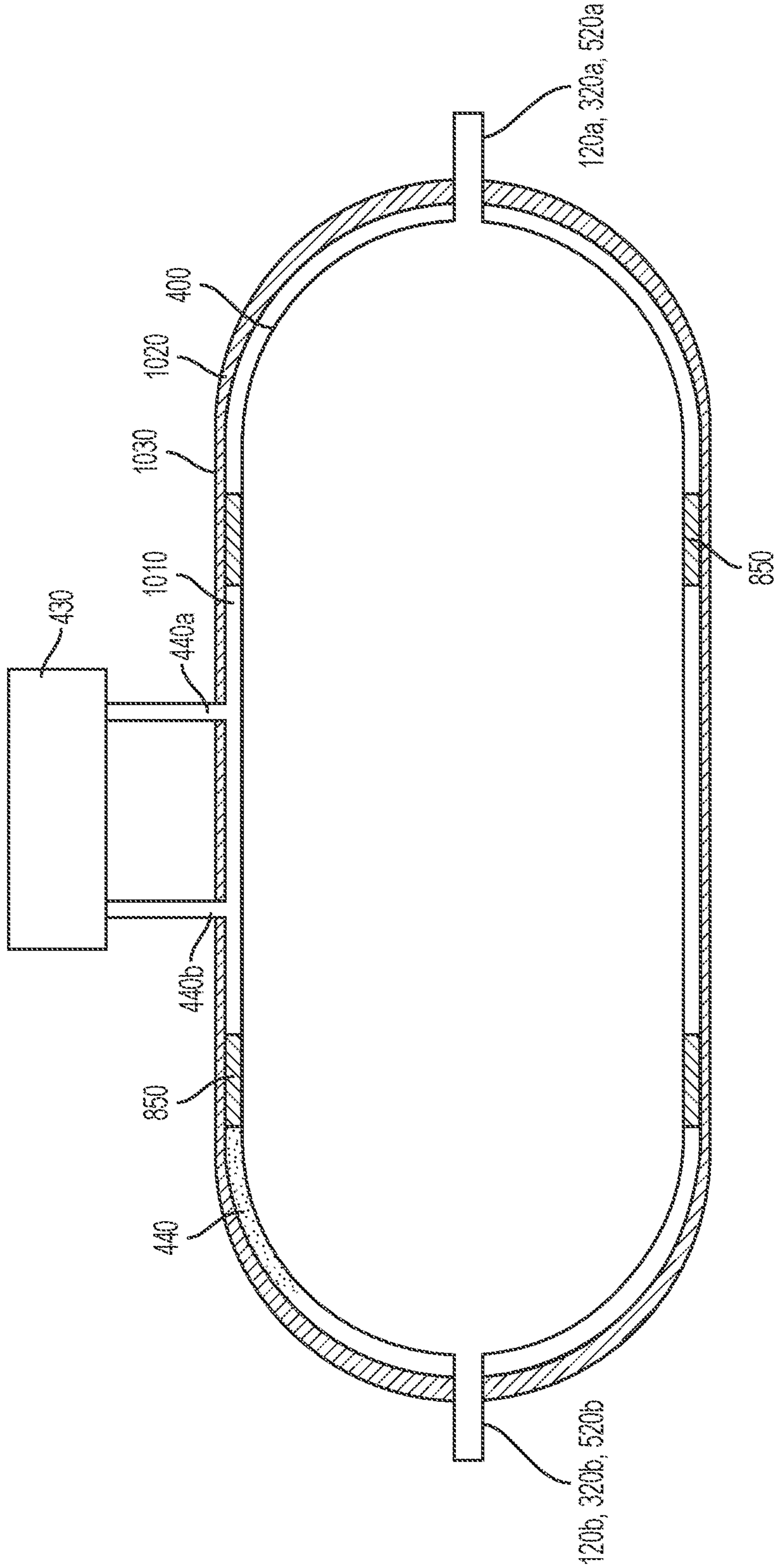
FIG. 10 is a diagrammatic, cut-away view of a cold storage unit according to one or more embodiments.

FIG. 10 illustrates an embodiment in which the insulated space 420 illustrated in FIG. 3 is incorporated into a jacket of the vessel 400. In FIG. 3, the insulated space 420 is illustrated as a rectangular, box-like shape. However, as shown in FIG. 10, an alternative insulated space 1010 may follow the contours of the vessel 400. The insulated space 1010 is defined between the vessel 400 and a surrounding layer of insulation 1020 that is encased within a jacket 1030. According to various embodiments, the jacket 1030 comprises a polymer or metal (e.g., 3.5% nickel steel). The jacket 1030 may provide impact protection to the vessel 400 and/or partial containment in case of a leak/rupture of the vessel 400. As shown in FIG. 10, the cooling system 430 forms solid CO2 440 in the space 1010. Alternatively, a similar cooling system may deliver liquid CO2 to the space 1010.

According to various embodiments, the rings 850 may structurally interconnect the vessel 400 and the insulation 1020 and jacket 1030. Holes may be formed in the rings 850 to permit coolant flow past the rings 850 within the space 1010. Alternatively, sets of parallel coolant ports 440*b*, 440*a* may be disposed in different sections of the space 1010.

FIG. 10 illustrates the vessel 400 in a horizontal position. However, the vessel 400 and associated space 1010, insulation 1020, and jacket 1030 may alternatively be vertically oriented so as to have the general orientation of the vessel 400 shown in FIG. 3.

While the above-discussed embodiments are described with respect to the storage and transportation of CNG, any of the above-discussed embodiments can alternatively be used to store and/or transport any other suitable fluid (e.g., other compressed gases, other fuel gases, etc.) without deviating from the scope of the present invention.

Unless otherwise stated, a temperature in a particular space (e.g., the interior of the vessel 400) means the volume-weighted average temperature within the space (without consideration of the varying densities/masses of fluids in different parts of the space).

The foregoing illustrated embodiments are provided to illustrate the structural and functional principles of various embodiments and are not intended to be limiting. To the contrary, the principles of the present invention are intended to encompass any and all changes, alterations and/or substitutions thereof (e.g., any alterations within the spirit and scope of the following claims).

What is claimed is:

1. A method for transporting cold compressed gas, the method comprising:

storing compressed gas in an interior volume of a storage vessel that is inside an enclosed and insulated space of a vehicle, the vessel defining a fluid barrier that isolates the interior volume from the enclosed and insulated space outside of the vessel;

refrigerating the insulated space using a closed-loop carbon-dioxide-based refrigeration unit supported by the vehicle, wherein said refrigerating comprises depositing solid carbon dioxide within the enclosed and insulated space, receiving gaseous carbon dioxide from the enclosed and insulated space into a carbon dioxide refrigerant loop passageway connecting the enclosed and insulated space to the refrigeration unit, wherein the carbon dioxide refrigerant loop passageway comprises a gaseous carbon dioxide inlet fluidly connected to the enclosed and insulated space and through which said gaseous carbon dioxide is received, the carbon dioxide refrigerant loop passageway having a carbon dioxide outlet fluidly connected to the enclosed and insulated space, using a compressor disposed along the carbon dioxide refrigerant loop passageway to compress gaseous carbon dioxide that is disposed in the carbon dioxide refrigerant loop passageway and was received via the gaseous carbon dioxide inlet, using a cooling system disposed along the passageway to cool the received gaseous carbon dioxide that is disposed within the carbon dioxide refrigerant loop passageway, forming solid carbon dioxide from carbon dioxide that was cooled with the cooling system, and depositing the formed solid carbon dioxide within the enclosed and insulated space; and moving the vehicle toward a destination facility, wherein said refrigerating comprises isolating the carbon dioxide refrigerant used by the refrigeration unit from the compressed gas in the interior volume.

2. The method of claim 1, wherein the compressed gas comprises compressed natural gas.

3. The method of claim 1, wherein said moving comprises moving the vehicle from a first geographic site to a second geographic site, and wherein a temperature within the insulated space remains between −98.7 and −58.5 degrees C. throughout said moving.

4. The method of claim 1, wherein:

forming solid carbon dioxide comprises:

ejecting liquid carbon dioxide into the insulated space via the carbon dioxide outlet; and solidifying liquid carbon dioxide within the insulated space, wherein the cooling of the gaseous carbon dioxide results in the formation of liquid carbon dioxide which is formed and solidified into solid carbon dioxide that is deposited into the insulated space.

* * * * *